(12) United States Patent
Bernard et al.

(10) Patent No.: US 9,555,334 B2
(45) Date of Patent: Jan. 31, 2017

(54) SYSTEM AND METHOD FOR MANAGING VIRTUAL WORLDS MAPPED TO REAL LOCATIONS IN A MOBILE-ENABLED MASSIVELY MULTIPLAYER ONLINE ROLE PLAYING GAME (MMORPG)

(75) Inventors: Christophe Bernard, San Diego, CA (US); Jason B. Kenagy, La Jolla, CA (US); Mazen Chmaytelli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2780 days.

(21) Appl. No.: 11/610,179

(22) Filed: Dec. 13, 2006

(65) Prior Publication Data

US 2008/0146338 A1 Jun. 19, 2008

(51) Int. Cl.
| | | |
|---|---|---|
| *A63F 13/12* | (2006.01) | |
| *A63F 13/822* | (2014.01) | |
| *A63F 13/00* | (2014.01) | |
| *A63F 13/40* | (2014.01) | |
| *A63F 13/30* | (2014.01) | |
| *A63F 13/216* | (2014.01) | |

(52) U.S. Cl.
CPC .............. *A63F 13/822* (2014.09); *A63F 13/00* (2013.01); *A63F 13/10* (2013.01); *A63F 13/12* (2013.01); *A63F 13/216* (2014.09); *A63F 2300/69* (2013.01); *A63F 2300/807* (2013.01)

(58) Field of Classification Search
USPC .......................................................... 463/42
See application file for complete search history.

(56) References Cited

U.S. PATENT DOCUMENTS

| | | | | |
|---|---|---|---|---|
| 2002/0090985 | A1* | 7/2002 | Tochner et al. | 463/1 |
| 2002/0167442 | A1* | 11/2002 | Taylor | 342/357.09 |
| 2003/0036428 | A1* | 2/2003 | Aasland | 463/29 |
| 2003/0144047 | A1* | 7/2003 | Sprogis | 463/9 |
| 2003/0177187 | A1* | 9/2003 | Levine et al. | 709/205 |
| 2006/0003824 | A1* | 1/2006 | Kobayashi et al. | 463/1 |
| 2006/0105838 | A1* | 5/2006 | Mullen | 463/31 |
| 2007/0149286 | A1* | 6/2007 | Bemmel | A63F 13/12 |
| | | | | 463/41 |

FOREIGN PATENT DOCUMENTS

| | | |
|---|---|---|
| FR | 2869709 A1 * | 11/2005 |
| GB | 2417694 A * | 3/2006 |

(Continued)

OTHER PUBLICATIONS

International Search Report and Written Opinion—PCT/US2007/087275, International Search Authority—European Patent Office—Apr. 29, 2008.

(Continued)

*Primary Examiner* — Tramar Harper
(74) *Attorney, Agent, or Firm* — Campbell C. Chiang (57) ABSTRACT

Apparatus and methods provide a player of a massively multiplayer online role playing game (MMORPG) to participate in at least one aspect of the MMORPG while using a wireless device. The wireless device executes a mobile MMORPG client, which interfaces with the game server(s) of the MMORPG via a mobile MMORPG server. A location based gaming mode for use with the wireless device is disclosed.

26 Claims, 7 Drawing Sheets

(56) References Cited

FOREIGN PATENT DOCUMENTS

| | | |
|---|---|---|
| GB | 2424842 | 10/2006 |
| KR | 20040009932 A | 1/2004 |
| WO | 0170358 | 9/2001 |
| WO | 02068075 | 9/2002 |
| WO | 2005028052 | 3/2005 |
| WO | 2006024866 A1 | 3/2006 |

OTHER PUBLICATIONS

Kazuya Matsubara, "Interactive Agents for Mobile Phones and its Application to NPC," Technical Report, The Information Processing Society of Japan, Dec. 17, 2005, vol. 2005, No. 125, pp. 71-78.
Hall J: "Mogi: Second Generation Location-Based Gaming", Internet Citation, Apr. 2004 (Apr. 2004), XP002352048, Retrieved from the Internet: [retrieved on Oct. 31, 2005] URL:<http://www.thefeaturearchives.com/topic/Gaming/Mogi_Second_Generation_Location-Based_Gaming.html>.

\* cited by examiner

SYSTEM AND METHOD FOR MANAGING VIRTUAL WORLDS MAPPED TO REAL LOCATIONS IN A MOBILE-ENABLED MASSIVELY MULTIPLAYER ONLINE ROLE PLAYING GAME (MMORPG)

FIELD OF THE INVENTION

The present invention relates generally to wireless communications, and more particularly to the use of location based services on a wireless device for interacting with a virtual world of a massively multiplayer online role playing game (MMORPG).

BACKGROUND OF THE INVENTION

Personal computers and computer-like devices, such as gaming consoles, are capable of hosting games which allow individuals and/or groups of individuals to explore and interact with a virtual environment. Examples of gaming consoles include Sony's PLAYSTATION® series of consoles and Microsoft's XBOX® series of consoles. The virtual environments presented in these games are highly detailed and typically present a gamer with a fantasy, science fiction, historical, or futuristic milieu.

Computer gaming began as a single player experience. Subsequently, multiplayer games were created allowing more than one player to play the same game at the same time, either cooperatively to achieve a common goal, as a competition against one another, or a mixture of both. Aspects of the game where players compete with or against computer controlled entities are generally known as player versus environment (hereinafter "PvE"), while aspects of the game where players compete against other players are generally known as player versus player (hereinafter "PvP"). Initially, multiplayer games were designed for multiple players to play on a single computer or computer-like device. However, as networking technology became more common, multiplayer games were designed to be played by different players each playing on their own computer or computer-like device.

As computer and computer-like devices become more powerful, and as network connectivity (including connectivity to the Internet) became more prevalent, the complexity of computer games and the number of simultaneous players increased. One genre of computer games is designed for play by a large number of simultaneous players. Such games are typically known as massively multiplayer online role playing games, or MMORPGs. These games are also sometimes known as massively multiplayer online games, or MMOs. For consistency, this document will use only the term MMORPG. Examples of MMORPGs include, for example, ULTIMA ONLINE®, EVERQUEST®, STAR WAR GALAXIES®, SHADOWBANE®, CITY OF VILLANS®, CITY OF HEROS®, FINAL FANTASY XI®, WORLD WAR II ONLINE®, EVE ONLINE®, EVERQUEST II®, WORLD OF WARCRAFT®, and DUNGEONS AND DRAGON ONLINE®.

A MMORPG permits a large number of people to share a virtual experience together by allowing the individual players to interact with each other in small and large groups. Players create alternate personas in the form of player characters. Players generally have the ability to customize their player characters' appearance, physical, and mental attributes. For example, a player can customize his character by selecting gender, facial appearance, body type, hair color/styles, skin tone, and clothing. Additionally, a character can be associated with additional attributes consistent with the theme of the MMORPG. For example, within a fantasy themed MMORPG, a player typically can choose to play a character selected from any of several races and classes. Examples of available races may include, humans, wood elves, high elves, dwarves, gnomes, dark elves, trolls, and ogres. Examples of classes may include clerics, druids, shamans, rangers, paladins, shadow knights, warriors, monks, rogues, bards, enchanters, magicians, necromancers, and wizards. Each of these choices may affect the appearance and capabilities of the player character.

By controlling their actions, players can cause their player characters to interact with other player characters and computer generated non-player characters in a computer generated virtual (or game) world. These actions may affect the status of the players characters and/or the environment of the game world, and thus further affect the appearance and/or capabilities of the player characters. Most MMORPGs permit multiple avenues for advancement of player characters. These may include defeating enemies in combat, performing quests (quests are discussed in greater detail in relationship to FIG. 6, below), exploration, or engaging in artisan activities. In many MMORPGs, successfully completing an activity which provides for advancement is rewarded by an award of experience points. Player characters may be organized into a series of increasingly powerful levels, with each increasing experience level requiring an increased accumulation of experience points. Higher level characters may fight with greater skill, tolerate a greater degree of damage before being defeated, have a wider range of abilities, or be capable of casting more powerful spells.

Further, while many MMORPGs permit player characters to advance by engaging in solo activities within the game world, the core of many MMORPGs is social interaction between the various players. Accordingly, MMORPGs generally permit player characters to form groups and for those groups to work together at a common goal. In order to facilitate group formation, many MMORPGs may include in-game features to facilitate group formation. For example, player characters can be visibly flagged by their players as "looking for a group" (hereinafter "LFG"). Alternatively, the game world may provide predetermined locations for player characters who are looking for a group to gather.

Figure 1:
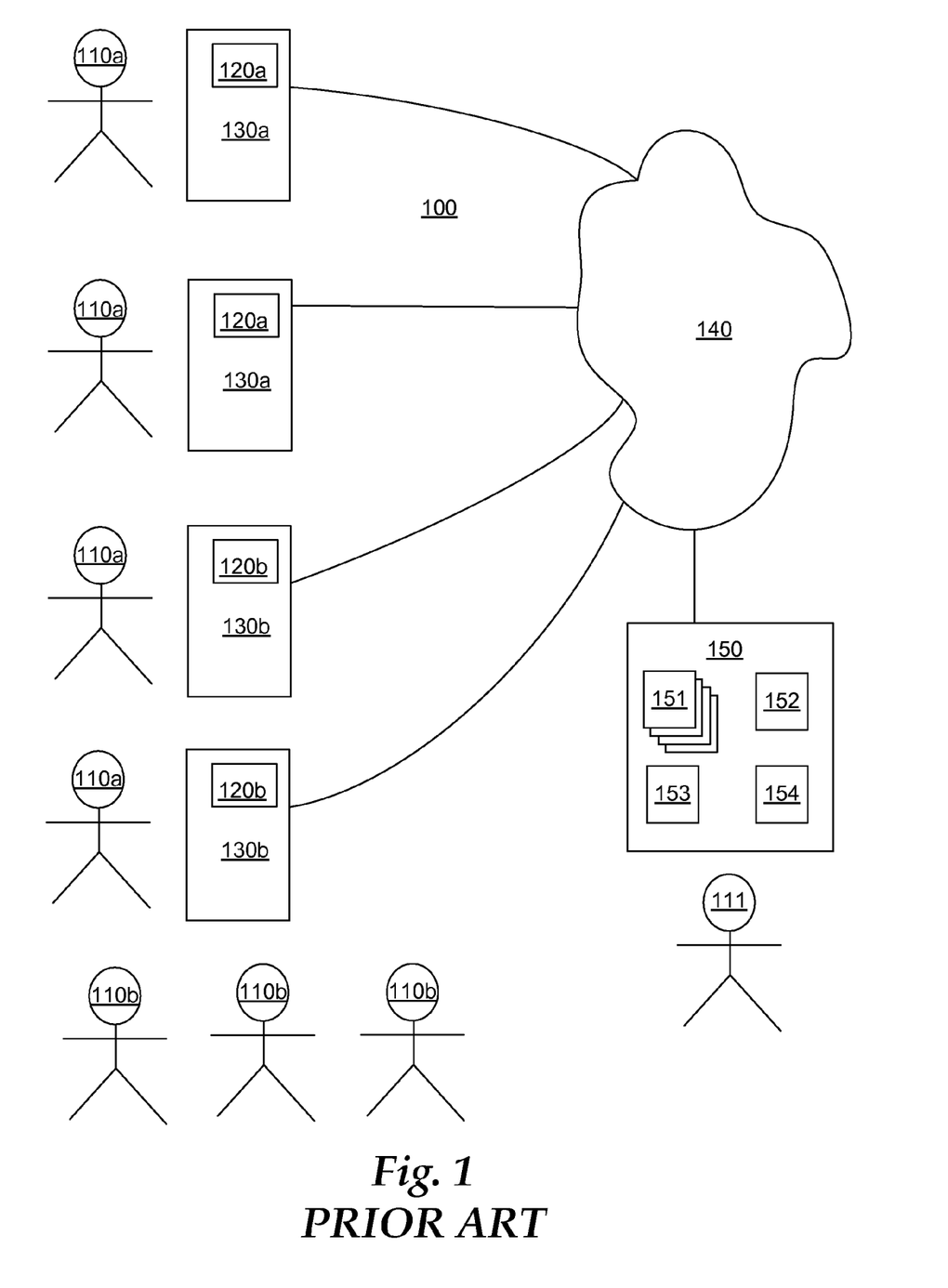
FIG. 1 is an illustration of a conventional system used to play a MMORPG.

FIG. 1 illustrates a system 100 for playing a MMORPG. Players 110a each install computer programs known as the game client 120a, 120b on their respective computers 130a or computer-like devices 130b. These devices 130a, 130b connect, via a network 140, which may be the Internet, to a game system 150. While there are various business models for recouping the costs of developing a MMORPG and operating the game system 150, players 110a are typically charged a fixed amount to purchase the game client software 120a, 120b and then pay a monthly fee for access to the game system.

The game system 150 includes at least one game server 151 for maintaining the state of the game world. Except for scheduled downtime to perform upgrades and administrative tasks, the server 151 is generally operated continuously, resulting in a game world which is persistent. Further, in order to avoid overcrowding of the virtual world, most MMORPGs support multiple shards (also known as instances) of the virtual world. Each shard generally shares a same basic design, but are generally populated by different sets of player characters. Thus, while each shard begins with a common set of initial states, the difference in actions taken by the player characters of each shard will cause each shard to have its own unique state. Alternatively, some shards may be operated using alternate rules of play, and thus may start with a different state than the common state. For example, in a game where most shards are operated in a predominately PvE mode, some shards may be operated to permit a greater range of PvP activities.

Typically, each shard is supported by its own hardware. For example, each shard may be supported by its own game server 151. Generally, administrative mechanism are built into the game system 150 to support moving characters between shards, thereby permitting expanding the number of game servers 151 when the MMORPG is increasing in number of players and contracting the number of game servers 151 when the MMORPG is decreasing in number of players.

The game system 150 may include other servers aside from one or more game servers 151. For example, most MMORPGs utilize at least one authentication server 152 for authenticating player log-ins to the game system 150. Most MMORPGs provide chat and/or message board services to its players. Such services may be provided by one or more messaging servers 153. Preferably, messaging servers 153 provide the chat and message board services via a web based interface. Further, most MMORPGs bill players a subscription fee for accessing the server. Billing services may be provided by one or more billing servers 154. Preferably, the billing servers 154 also provide a web based interface for players to enter and edit their contact and billing information.

Also shown in FIG. 1 is a game master 111. The operation of any MMORPG generally requires a number of game masters. Each game master 111 is a customer service agent for the entity which runs the game system 150. Their role in the MMORPG may be to address customer issues. Such issues may include a character which is stuck in the virtual world due to a bug in the MMORPG, arbitrating a dispute between multiple players 110a, or managing special events, such as holiday related events.

As previously noted, the game system 150 maintains the game world in a persistent state. Thus, a player can reasonably expect that even when the player is logged-out of the MMORPG, other players are playing the MMORPG and thus, changing the state of the virtual world. Typically, a player can log-out of the MMORPG under certain predetermined conditions (e.g., the player's character is not engaged in combat, or the player's character is located in a safe location within the virtual world). When the player logs-out of the MMORPG, the state of the player's character is saved by the server and then the player's character is removed (i.e., vanishes from the perspective of other characters) from the virtual world. Conversely, when the player logs-in to the MMORPG, the state of the player's character is restored and the player's character is inserted (i.e., appears from the perspective of other characters) into the game world at the same location as when the player logged out of the MMORPG. In FIG. 1, players 110a represent players which are logged-in to the MMORPG, and therefore have characters which appear in the virtual world, while players 110b represent players which have logged-out the MMORPG, and therefore do not have characters which appear in the virtual world.

Many of the players 110b who are logged-off the MMORPG would like to be able to further participate in the affairs of the virtual world supported by the MMORPG. Such players 110b may not have access to a computer 130a or computer-like devices 130b to run the regular game client 120a, 120b. Although such players 110b may have mobile devices, generally, it is impractical to run a version of the standard game client 120a, 120b on the mobile device. This partially due to the enormous amount of data processed by the client 120a, 120b present the virtual world. For example, the game client for the WORLD OF WARCRAFT® requires four gigabytes of memory. Accordingly, there is a need and desire for methods and apparatus to permit a player of the MMORPG to have increased interactions with the MMORPG.

SUMMARY OF THE INVENTION

The disclosed embodiments provide apparatus and methods for a MMORPG player to participate in at least one aspect of the MMORPG while using a mobile device. The wireless device executes a mobile MMORPG client, which interfaces with the game server(s) of the MMORPG via a mobile MMORPG server. While the mobile MMORPG client generally supports a subset of the interaction capability a regular MMORPG, the mobile MMORPG client preferably supports one gaming mode not available to the regular client. This gaming mode is known as location based gaming and takes advantage of the inherent mobile nature of mobile devices. A mobile MMORPG server is used to support location based gaming.

BRIEF DESCRIPTION OF THE DRAWINGS

The foregoing and other advantages and features of the invention will become more apparent from the detailed description of exemplary embodiments of the invention given below with reference to the accompanying drawings in which.

DETAILED DESCRIPTION

Figure 2:
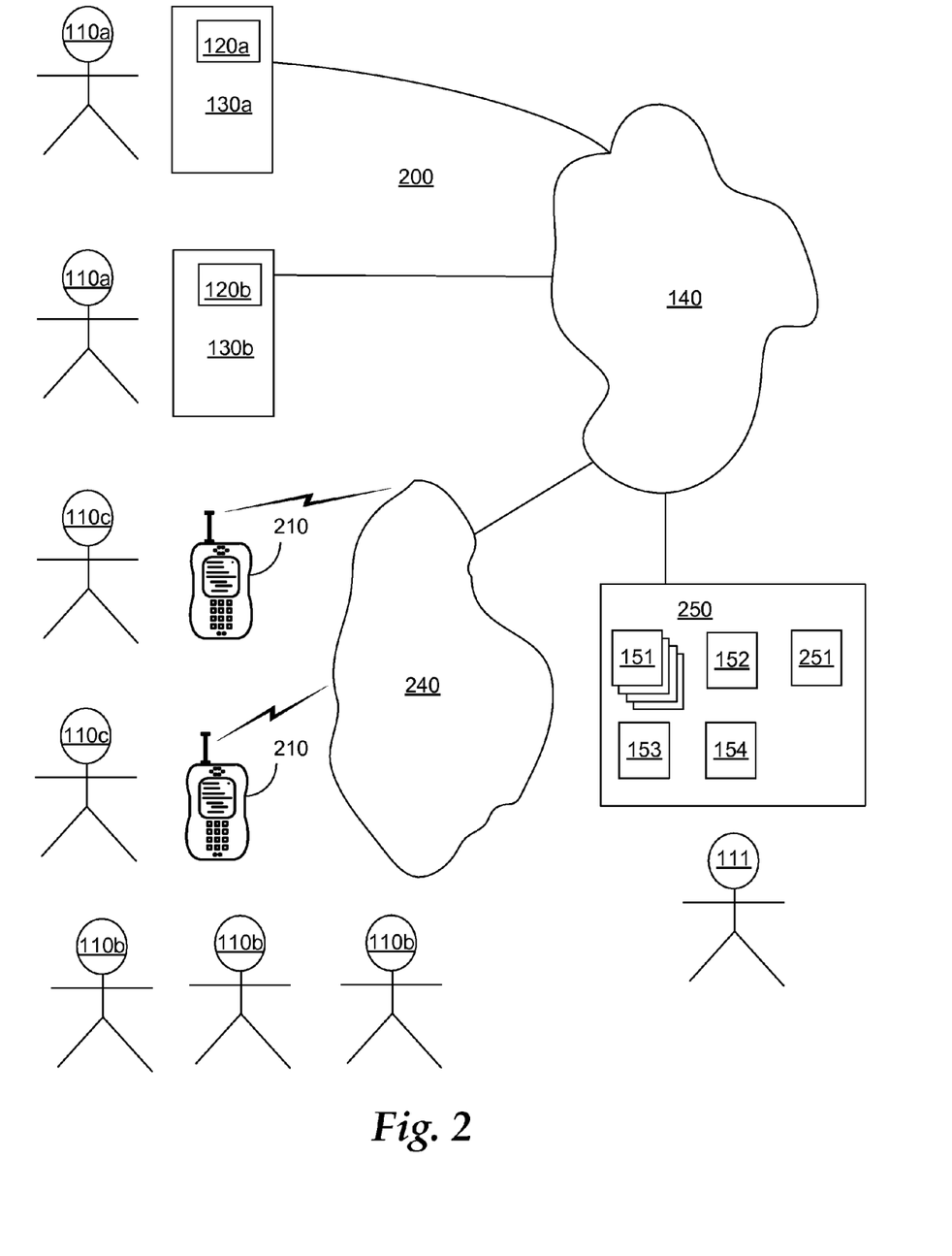
FIG. 2 is an illustration of one embodiment to permit players to have increased interaction with a MMORPG using a mobile device and a wireless network.

Now referring to the drawings, where like reference numerals designate like elements, there is shown in FIG. 2, a system 200 for permitting players to have increased interaction with an MMORPG in accordance with one embodiment of the present invention.

System 200 includes a plurality of online players 110a are playing the MMORPG by running a game client 120a or 120b on their computer 130a or computer-like devices 130b. The computer 130a and computer-like devices 130b are coupled to a network 140, which in one embodiment may be the Internet, to communicate with a modified game system 250. The modified game system 250 is illustrated to include a plurality of game servers 151 for supporting separate shards of the MMORPG, an authentication server 152 for validating users' log-ins, a messaging server 153 for providing chat and/or message board services, which are preferably web based, and a billing server 154 for billing the users who play the MMORPG, and for permitting users to enter contact and billing information via a secure web site. The modified gaming system 250 also includes a mobile MMORPG server 251, which will be described in greater detail later, in connection with FIG. 5. Although no internal network connections are shown within the modified gaming system 250 in order to avoid cluttering the figure, it should be understood that each of the illustrated servers 151, 152, 153, 154, 251 are networked and thus messages may be passed between any of the illustrated servers 151, 152, 153, 154, 251.

While servers 151, 152, 153, 154, and 251 are represented as discrete servers, it should be recognized that any combination of the above noted servers may in fact be implemented as a distributed system of multiple servers, or conversely, the multiple servers may be implemented with a lesser number of servers, or even a single server, by using for example, server virtualization technology. Also while, the mobile MMORPG server 251 is illustrated as being a component of the game system 250, and thus co-located with the other servers 151, 152, 153, and 154, one skilled in the art would recognize that the invention can be practiced using other configurations, for example, locating the mobile MMORPG server 251 in the wireless network 240 (such as at a wireless carrier's data center).

The system 200 also includes a plurality of offline players 110b, and at least one game master 111. As shown, the game master 111 may be proximately located to the game system 250, thereby permitting the game master 111 to directly interact with the game system 250. Alternatively, the game master 111 may be located at a remote location, such as an overseas call center, and may remotely interact with the game system 250 via a computer system coupled to the network 140 (not illustrated).

The system 200 further include players 110c, who are no longer logged into the MMORPG, but unlike players 110b, these players 110c wish to continue to participate in the virtual world of the MMORPG. The system 200 enables such users to continue to interact with the MMORPG through the establishment of a mobile MMORPG game session. The mobile MMORPG session is supported by the modified game system 250 through the inclusion of a mobile MMORPG server 251, which is in communication with the game servers 151. The mobile MMORPG session is supported for the users through the inclusion of additional software modules to each user's wireless device 210. Each user's wireless device 210 can communicate with the mobile MMORPG server 251, and thus the game servers 151, via the wireless network 240 and the network 140.

In one embodiment, the wireless devices 210 are wireless telephones, such as cellular phones, which also support a computer platform for downloading and executing application programs at the phone. However, it should be understood that the principles of the present invention can also be applied to other types of mobile or portable communications device having a similar computer platform, such as some types of personal digital assistant (PDA), a two-way text pager, a laptop computer and a tablet computer.

Before describing the interaction of the players 110c via their wireless devices 210 with the game system 250, it is helpful to review the operation of the wireless network 240 and the wireless device 210.

Figure 3:
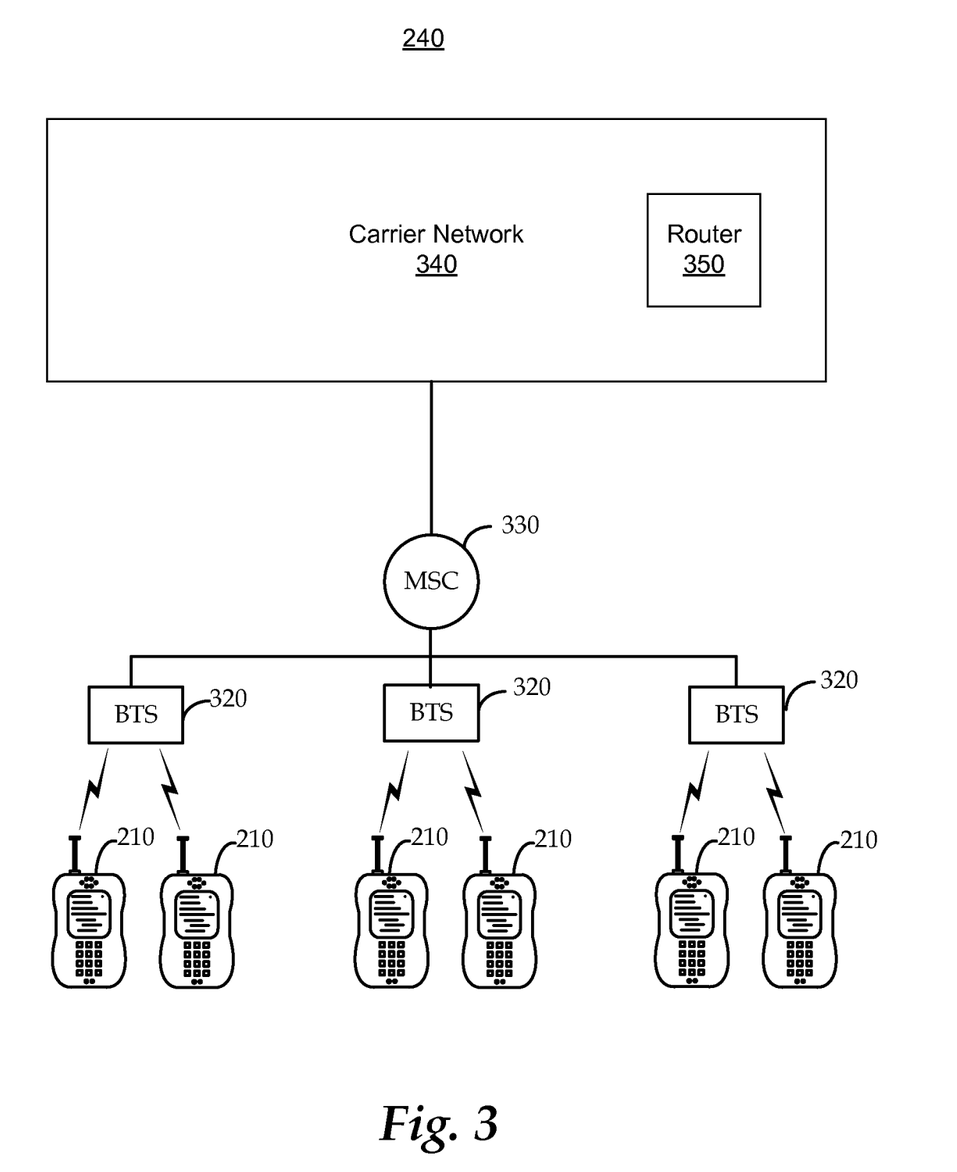
FIG. 3 is an illustration of how mobile devices interact with a wireless network.

FIG. 3 is a more detailed illustration of the wireless network 240. The wireless network 240 includes a plurality of base stations (BTS) 320 which are arranged to provide coverage over a geographic area. When in communication with the wireless network 240, each wireless device 210 is typically in communication with a just one of the BTSs 320. However, there may be some situations where a wireless device 210 is in communication with multiple BTSs 320. Such situations may occur when the wireless device 210 transiting between the coverage areas of two BTSs 320 and the wireless network is using a soft hand-off technique for controlling the transition between two different BTSs 320. Another example of such a situation may include calculating a geographic location of the wireless device 210 based upon the location of two or more BTSs 320.

The wireless network 240 also includes a mobile switching center (MSC) 330. The MSC is in communication with each of the BTSs 320, as well as another network. As illustrated, the other network is the carrier network 340 of the wireless carrier operating the BTSs 320 and the MSC 330. The carrier network 340 may include a router 350, for coupling the carrier network 340 to another network, such as network 140, which in one embodiment is the Internet.

Accordingly, the wireless network 240 provides the capability for routing data between the wireless devices 210 and servers on the Internet through the uses of its BTSs 320, MSC 330, carrier network 340, and router 350.

Figure 4:
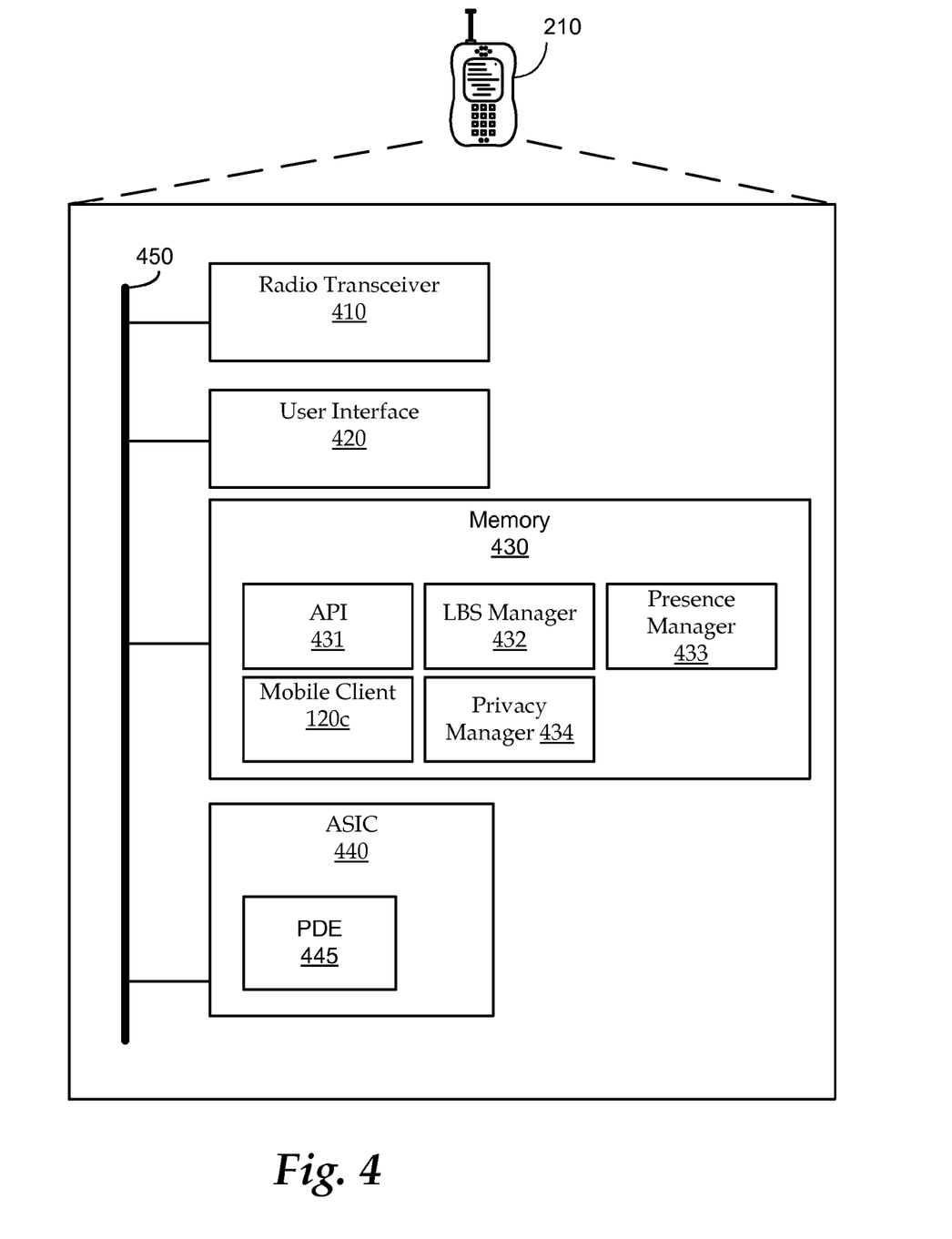
FIG. 4 is a more detailed illustration of a mobile device in accordance with one embodiment of the invention.

FIG. 4 is a more detailed illustration of the wireless device 210. The wireless device 210 includes a radio transceiver 410 for wirelessly communicating with one or more BTSs 320 (FIG. 3) of the wireless network 240. The radio transceiver 410 is coupled to a bus 450. The wireless device 210 also includes a user interface 420, which is also coupled to the bus 450. In one embodiment, the wireless device 210 is a cellular telephone and the user interface 420 includes a display, a small keyboard, a microphone, and a speaker. The wireless device 210 also includes a memory 430, which is also coupled to the bus 450. The memory 430 may store code for supporting an application programming interface (API) 431. In one embodiment the API is the API associated with QUALCOMM®, Inc.'s BREW® platform, however, the wireless device may support other APIs.

The contents of the memory 430 also include a mobile client 120c, a location based server (LBS) manager 432, a presence manager 433, and a privacy manager 434, each of which are discussed in greater detail below. The wireless device 210 preferably supports the feature of downloadable applications. In one embodiment, the MMORPG mobile client 120c is installed in the wireless device via an application download from the wireless network 240. The wireless device 210 also include an application specific integrated circuit (ASIC) 440, which controls the radio transceiver 410, user interface 420, and memory 430 via the bus 450. The ASIC 440 preferably includes a position determination equipment (PDE) 445 for identifying a geographic location of the wireless device. The PDE 445 may determine the geographic location of the wireless using a variety of methods. For example, the PDE 445 may use signals transmitted from global positioning satellites (GPS) received by the radio transceiver 410 and convert the GPS signals into location data. Alternatively, the PDE 445 may use signals transmitted between the radio transceiver 410 and one or more BTSs 320 (FIG. 3) and use techniques based on some combination of triangulation, angle of arrival (AOA), time of arrival (TOA), or enhanced observed time difference (E-OTD), to determine the location of the wireless device 210.

One skilled in the art would understand that the architecture of the wireless device 210 can be varied without departing from the scope of the invention. For example, some potential variations include having multiple radio transceivers 410, having multiple memory units, including, for example, different memory units such as a DRAM base memory unit and a FLASH memory unit. In some embodiments, at least part of the memory 430 may be embodied on the ASIC 440. Further, the ASIC 440 may be a plurality of ASICs or some combination of a non-ASIC chip and one or more ASICs. In particular, the PDE may be on its own chip, or alternatively, the PDE may be a software module residing in the memory 430.

The Mobile Client 120c

The mobile client 120c is an important component of the system 200 for supporting players 110c to continue to interact with the virtual world of the MMORPG. As with the regular client, the mobile client 120c is an application which renders a view of the virtual world, and which provides a mechanism for the player 110c to interact with the virtual world.

As previously noted, the detailed virtual worlds of the MMORPG are stored using a large amount of memory not normally available in wireless device. Accordingly, the quality of the view of the virtual world rendered by the mobile client 120c and the level of player interaction permitted by the mobile client 120c is typically a subset of what may be possible with the regular game client 120a, 120b. One example of such limitations may be that players 110c using the mobile client 120c may be limited to certain portions of the virtual world. Another example is that players 110c using the mobile client may be limited in their range of actions. Players 110c might not be able to engage in PvP action, or mobile MMORPG players 110c might only be able to engage in PvP action against other mobile MMORPG players 110c, and not against players 110a using regular clients 120a, 120b.

Another example may relate to how or whether players 110a using regular clients 120a, 120b view or interact with players 110c using the mobile client 120a. Since the players 110c using the mobile client 120b are limited in their range of interaction, in one embodiment, the two types of online players, i.e., players 110a and 110c, are divorced from each other and one group of players cannot view or interact with another group of players. In such embodiments, certain portions of the virtual world may be restricted solely for use by player 110c using the mobile client 120c while the remaining portions of the virtual world may be dedicated to players 110a using the regular client 120a, 120b.

Alternatively, players 110a and 110c may be handled as normally as possible, thereby permitting interactions between the two groups of players 110a, 110c. Due to limitations associated with the mobile client 120c, it may be necessary to place similar limitations on players 110a using the regular client 120a, 120b. In such embodiments, players 110c using the regular client 120a, 120b may be restricted to certain portions of the virtual world, and if a player 110a using the regular client 120a, 120b enters into the restricted area, that player 110a may restricted to operate as if the player 110a were running a mobile MMORPG client 120c. As an example, a restriction on the mobile client 120c may be that full combat capability may not be supported, and a portion of the virtual world permitted for interaction between the two groups of players 110a, 110c may be an auction house, which could be designated as a "no combat" zone in the game, thereby permitting players 110a, 110c to engage in commerce but not combat.

The LBS Manager 432

The mobile MMORPG game supports one gaming mode not available to players 110a using the regular client 120a, 120b. This gaming mode is known as location based gaming, and takes advantage of the inherent mobility of mobile devices. Location based gaming will be discussed in greater detail below, in connection with FIG. 6. However, in order to support location based gaming, the mobile MMORPG client must have the capability of determining the physical location of the wireless device 210 in the real world. The LBS Manager 432 is responsible for providing the geographic location of the wireless device 210 to the mobile client 120c. In one embodiment, the LBS Manager 432 may obtain geographic coordinates from the position determining equipment 445.

The Presence Manager 433

The presence manager 433 is used by players of the mobile MMORPG client 120c to see other players of the mobile MMORPG client 120c. More specifically, each player may also be flagged to indicate that the player is LFG, or wants to participate in location based gaming.

The Privacy Manager 434

The privacy manager 434 is used to control a player 110c's visibility to other players 110a, 110c and to determine whether the player is accepting game related messages from other players 110a, 110c. This is because there may be times when the player 110c is unavailable to engage in MMORPG related activity. Under such circumstances, that player 110c likely would not want to receive MMORPG related messages. Accordingly, the privacy manager 434 can be used to indicate that a player 110c is not available for mobile MMORPG related activities. Further, the privacy manager can also be used to automatically reject messages related to the MMORPG (as a whole), or just to the mobile MMORPG portion of the MMORPG. Conversely, a player 110c may be actively looking for a group and can also use the privacy manager to flag himself so that other players 110c would notice that he is looking for a group. As discussed below with reference to FIG. 5, preferably, the game system 150 also implements a web page for the player to set his privacy level.

Figure 5:
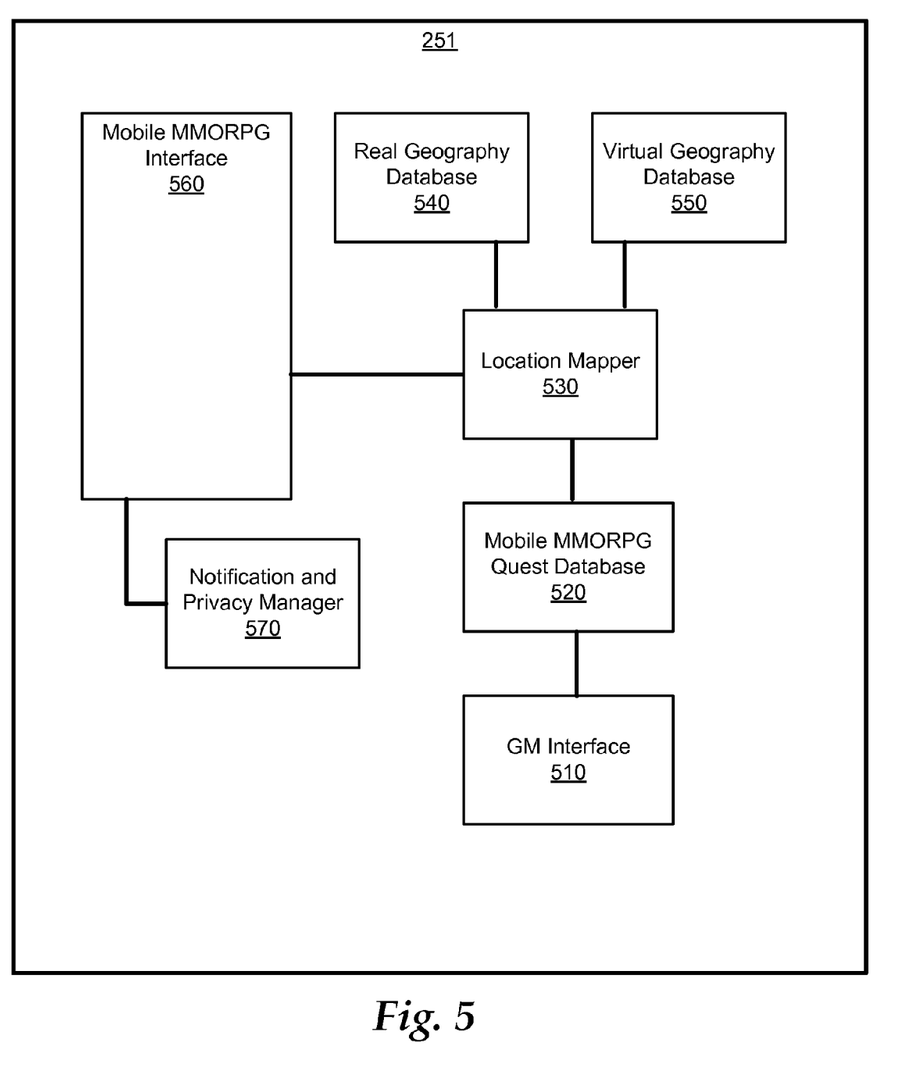
FIG. 5 is a more detailed illustration of a mobile MMORPG server shown as part of FIG. 2.

FIG. 5 is a more detailed illustration of the mobile MMORPG server 251. The mobile MMORPG server 251 includes a game master (GM) interface 510, a mobile MMORPG quest database 520, a location mapper 530, a real geography database 540, a virtual geography database 550, a mobile MMORPG interface, and a Notification and Privacy Manager 570, which are arranged as shown in FIG. 5. In the illustrated embodiment, there is one mobile MMORPG server 251 associated with all of the game servers 151, 152, 153, 154 of the game system 150. However, it should be understood that the invention may be practiced using other arrangements. For example, each game server may have integrated therein a version of the mobile MMORPG server 251.

The GM Interface 510

The GM interface 510 is a user interface module accessible by game masters of the mobile MMORPG. From this interface, game masters may design, modify, enable, disable, or delete mobile MMORPG quests. The GM interface 510 is in communication with the mobile MMORPG quest database 520, as described in greater detail below. After designing and enabling a new mobile MMORPG quests, a GM may use the GM interface 510 to host the quest as a live event by making announcements and picking players who wish to join the new quest. Alternatively, the game master may use the GM interface 510 to bind the quest to an in-game object, such as a non-player character who gives interested players the quest, thereby permitting players to choose with who and at when they may wish to participate in the quest.

The Mobile MMORPG Quest Database

The mobile MMORPG quest database 520 is a database which stores the quests which are designed, modified, enabled, or disabled via the GM interface 510. Existing quests may also be deleted from the quest database through the GM interface 510. The mobile MMORPG quest database 520 is in communication with the GM interface 510, described above, the location mapper 530, described below.

The Real and the Virtual Geography Databases, and the Location Mapper 540, 550, 530

The real geography database 540, the virtual geography database 550, and the location mapper 530 are used to support location based gaming, which is discussed in greater detail below in connection with FIG. 6. The real geography database 540 is a geographic database of the real world, and preferably include both geographic information mapping locations to coordinate, as well as a point-of-interest database, for locating specific types of locations. For example, a point-of-interest database might be able to locate coffee houses, restaurants, malls, stores, other publicly accessible commercial establishments, parks, libraries, museums, publicly accessible government facilities, etc. The virtual geography database 550 is a geography database of the virtual world. The location mapper 530 is capable of querying and receiving information from both the real and virtual geography databases 540, 550. The use of the databases 540, 550 and the location mapper 530 will be discussed in connection with FIG. 6.

The Mobile MMORPG Interface 560

The mobile MMORPG interface 560 is used by the mobile MMORPG server 251 to send and receive messages between the mobile MMORPG server 251 and the player's 110c wireless device 210. The mobile MMORPG interface 560 is also used by the mobile MMORPG server 251 to send and receive messages between the mobile MMORPG server 251 and servers 151, 152, 153, 154 of the game system 150.

The Notification and Privacy Interface 570

The notification and privacy interface 570 is a component which interfaces with the mobile MMORPG interface 560, and from the mobile MMORPG interface 560, to the notification and privacy manager 434 of the wireless device 210 and the messaging server 153 of the gaming system 150. The notification and privacy interface 570 provides an interface to accept notification and privacy information from the notification and privacy manager 434 of the wireless device 210, as previously described. Additionally, the messaging server 153 of the gaming system 150 preferably also supports a web page for accepting similar information. The notification and privacy interface 570 therefore supports a wireless device 210 based method and a web based method for specifying whether a player 110c wishes to participate in the mobile MMORPG game. Once the player's preference has been obtained, that information is communicated to the mobile MMORPG interface 560 and the appropriate game server 151 so that inappropriate messages are not sent players who choose not to participate in the mobile MMORPG game.

Questing, or the action of performing quests, is typically an important component of an MMORPG. A quest is a series of tasks which a player accepts. The quest is completed when the player finishes the entire series of tasks. Typically, the player is awarded with a reward for completing a quest. The series of task may be a single task or a plurality of tasks. Typically, at least one task of the quest will be a travel task for a player character to travel from a first point A to a second point B in the virtual world.

The mobile MMORPG supports location based gaming, which can be applied to any travel task undertaken in the MMORPG. Location based gaming will now be discussed in greater detail in relationship to FIGS. 6-7. More specifically, FIG. 6 illustrates a process 600 for supporting location based gaming from the perspective of the mobile MMORPG server 251, and encompasses the act the mobile MMORPG server 251 performs when creating and administering a quest having a single travel task. Similarly, FIG. 7 illustrates a process 700 for supporting location based gaming in the same context, but from the perspective of the wireless device used the player 110c.

Figure 6:
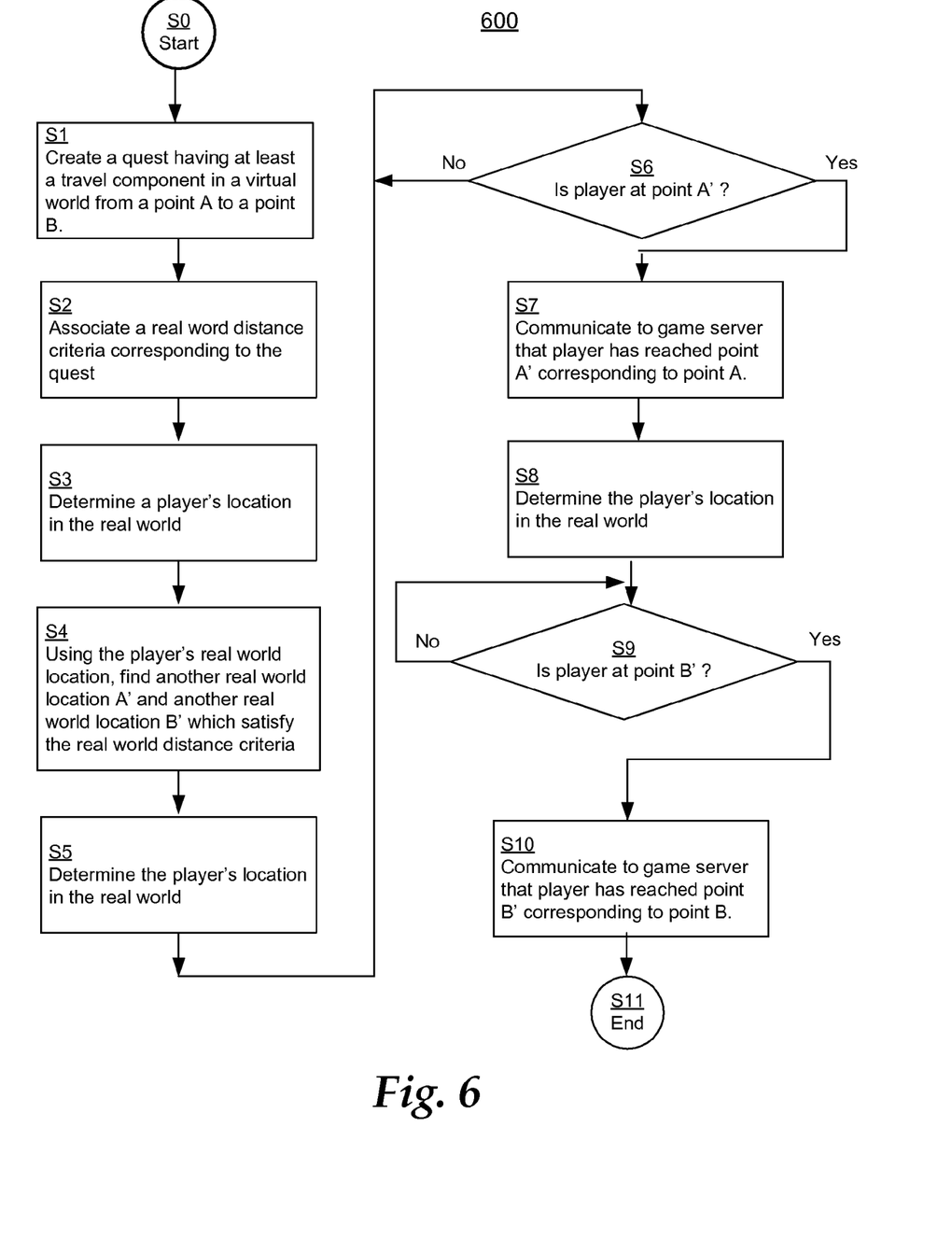
FIG. 6 is a flow chart illustrating location based gaming from a server perspective.
Figure 7:
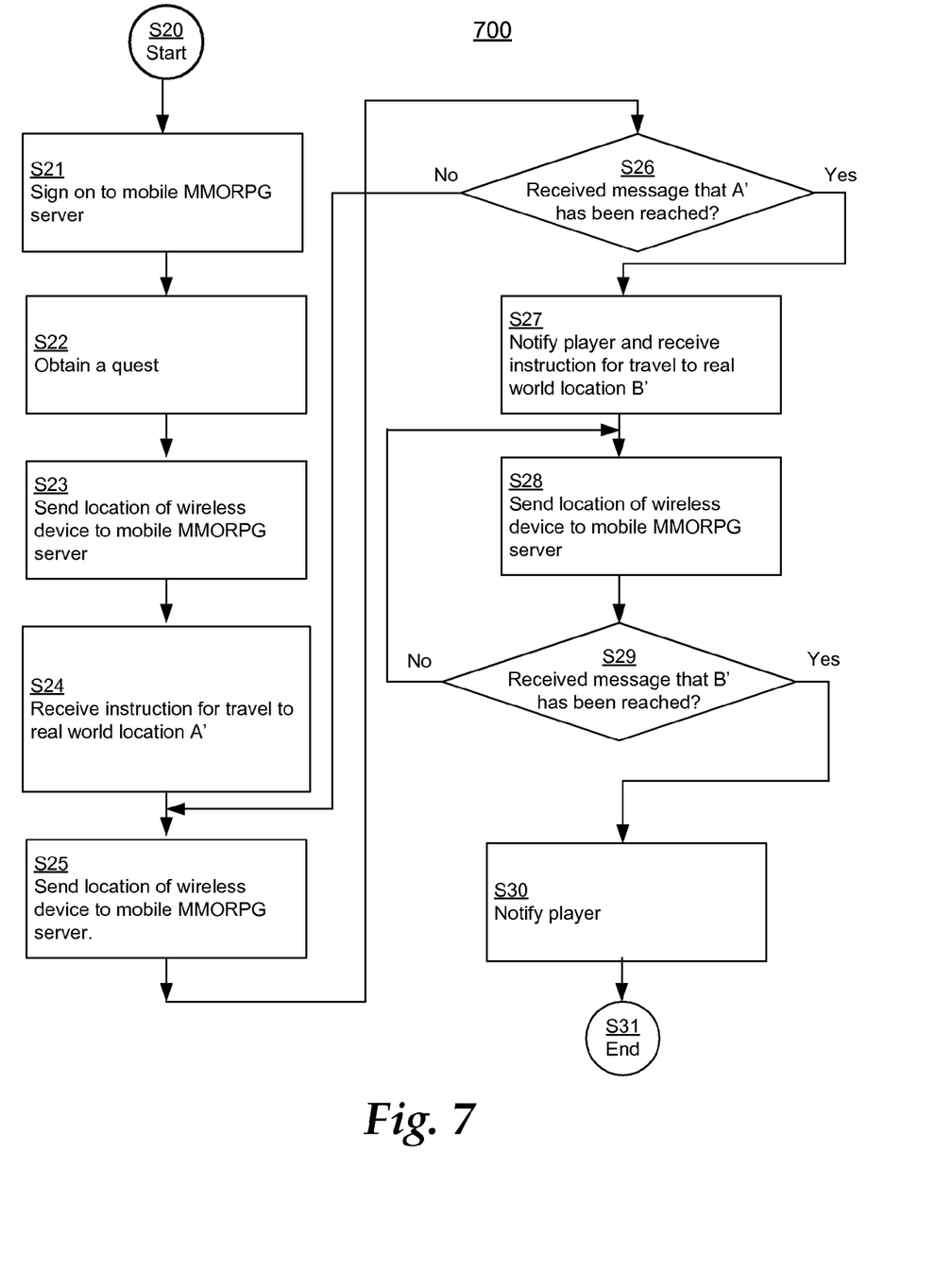
FIG. 7 is a flow chart illustrating location based gaming from a wireless device perspective.

Now referring to FIG. 6, the process 600 starts at step S0 and ends at S11. Location based gaming is a mode of gaming not available to players 110a using the regular game client 120a, 120b. Location based gaming, as described below, takes advantage of the inherent mobility of wireless devices and permits real world travel and interaction to translate into a set of similar actions in the virtual world.

At step S1, a quest is created. As noted above, for the purposes of this example, the quest is a single travel task requiring the player's character to travel from a first point A to a second point B, where both points A and B are in the virtual world. Step S1 is typically performed by a game master working on the GM interface 510 (FIG. 5). Alternatively, step S1 may also be performed by a game designer, who might have his own interface to the quest database (not illustrated). The process 600 continues at step S2.

At step S2, a distance criteria relating to the real world is created and associated with each sequential pair of travel waypoints in the quest. In one embodiment, the distance criteria includes a parameter specifying an allowable range of distances for a player to travel to a first waypoint and a parameter for specifying an allowable range of distances for the player to travel between the first and a second waypoint. In other embodiments, the distance criteria may only specify an maximum allowable range (i.e., no minimum range requirement). Yet another embodiment may only specify the allowable range between the first and second waypoints without restricting the range between a player's current location and the first waypoint. Step S2 may be performed by a game master working on the GM interface 510 (FIG. 5), although a game designer may also design the distance criteria as part of the design of MMORPG. The process 600 continues at step S3.

At step S3, the mobile MMORPG server 251 receives, at its mobile MMORPG interface 560, a message from the wireless device 210 of the player 110c which communicates the location of the wireless device 210 in the real world to the mobile MMORPG server 251. The process 600 continues at step S4.

At step S4, the location mapper 530 (FIG. 5) is used to search the real geography database 540 (FIG. 5), to set a location A' in the real world to correspond to point A in the virtual world. Preferably, the location is a point-of-interest, for example, a coffee house. The location mapper 530 then applies the distance criteria against location A' to locate a real world location B' which is assigned to correlate to position B in the virtual world. Preferably, the location B' is a point-of-interest. In one embodiment, step S4 is automatically performed by the location mapper 530. In another embodiment, step S4 is manually performed by a GM at the GM interface 510 (FIG. 5). The process 600 continues at step S5.

At step S5, the mobile MMORPG server 251 receives, at its mobile MMORPG interface 560, a message from the wireless device 210 of the player 110c which communicates the location of the wireless device 210 in the real world to the mobile MMORPG server 251. The process 600 continues at step S6.

At step S6, the player's location in the real world is compared to the location A' to determine whether the player has reached the starting point A' associated with the quest. If so, the process 600 continues at step S7. If not, the process 600 returns to step S5.

At step S7, the mobile MMORPG server 251 communicates to the game server 151 that the player has reached location A'. This causes the game server 151 to advance the player's character in the virtual world to virtual world location A. The process continue at step S8.

At step S8, the mobile MMORPG server 251 receives, at its mobile MMORPG interface 560, a message from the wireless device 210 of the player 110c which communicates the location of the wireless device 210 in the real world to the mobile MMORPG server 251. The process 600 continues at step S9.

At step S9, the player's location in the real world is compared to the location B' to determine whether the player has reached the starting point B' associated with the quest. If so, the process 600 continues at step S10. If not, the process 600 returns to step S9.

At step S10, the mobile MMORPG server 251 communicates to the game server 151 that the player has reached location B'. This causes the game server 151 to advance the player's character in the virtual world to virtual world location B, and the player, having just traveled from real world location A' to real word location B', has caused the player's characters to travel from virtual world location A to virtual world location B, thereby satisfying the travel task element of the quest created in step S1.

Now referring to FIG. 7, the process 700 starts at step S20 and ends at S31.

At step S21, player 110c signs on to MMORPG via a wireless device 210. In one embodiment, the sign on request is sent to the mobile MMORPG server 251, which communicates with the authentication server 152 on behalf of the player 110c.

At step S22, the player character associated with the player 110c interacts with the MMORPG and obtains a quest enabled for location based gaming. The interaction for obtaining the quest may be any number of mechanisms, including, for example, the player character interacting with a non-player character, the player character traveling to a predetermined location in the virtual world, or the player character responding to a quest announcement made by a game master 111.

At step S23, the wireless device 210 sends a message to the mobile MMORPG server 251 which communicates the location of the wireless device 210 in the real world to the mobile MMORPG server 251. The process 700 continues at step S24.

At step S24, the wireless device 210 receives instruction from the mobile MMORPG server 251 directing the player to travel to point A'.

At step S25, the wireless device 210 sends a message to the mobile MMORPG server 251 which communicates the location of the wireless device 210 in the real world to the mobile MMORPG server 251. The process 700 continues at step S26.

At step S26, the wireless device checks to see whether it received a message from the mobile MMORPG server indicating that point A' has been reached by the player 110c. If not, the process 700 continues at step S25. If so, the process continues with step S27.

At step S27, the player 110c is notified as having reached, and the wireless device 210 receives instruction for the player to travel to real world location B', and the instruction is displayed to the player 110c. The process 700 continues at step S28.

At step S28, the wireless device 210 sends a message to the mobile MMORPG server 251 which communicates the location of the wireless device 210 in the real world to the mobile MMORPG server 251. The process 700 continues at step S29.

At step S29, the wireless device checks to see whether it received a message indicating that point B' has been reached by the player 110c. If not, the process 700 continues at step S28. If so, the process continues with step S30.

At step S30, the player is informed that the travel from A' to B' has completed the travel task portion of the quest. The process 700 ends at S31.

Location based gaming, therefore, takes advantage of the mobile nature of wireless devices and maps virtual world locations to real world locations. The real world locations are preferably publicly accessible points of interest, thereby permitting players to perform travel components of quests in the real world. While FIGS. 6-7 illustrate a simplified quest having only a travel task, many actual quests in MMORPG often include multiple travel segments and each travel segment can be handled in a manner similar to steps S2-S10. Additionally, at the beginning or end of each travel segment, the player character may be required to perform additional actions. These may include conversing with a non-player character, finding an item, killing a monster, etc. In location based gaming, tasks in the virtual world may also be mapped to a set of tasks in the real world, such that if the player performs a task in the real world, the mobile MMORPG server 251 would communicate to the game server 151 that the player character had performed the corresponding task in the virtual world.

Variations on the real world activity may include having two separate players which are within a predetermined proximity travel to a same destination in the real world and to interact with each other. For example, a first and a second player may each be assigned differing A' locations but a same B' location. The quest, or a portion thereof, can be satisfied once both players have traveled from their respective A' locations to the B' location.

Location based gaming may also apply to groups of players, where a plurality of players within a predetermined proximity could form a group in the virtual and real worlds, and would be assigned the same A' and B' locations.

The present invention is therefore directed in part to an apparatus and method for permitted players of a MMORPG to continue to interact with the virtual world of the MMORPG through their wireless devices. Each player's wireless device includes a mobile MMORPG client and associated modules related to location determination, privacy management, and presence management. Each player's wireless device interacts with a mobile MMORPG server, which also communications with the game servers of the MMORPG. The mobile MMORPG server preferably includes a mechanism for creating location based gaming scenarios, which can be stored as quests in a quest database of the mobile MMORPG, thereby permitting the players on the wireless devices to engage in location based gaming.

While the invention has been described in detail in connection with the exemplary embodiments, it should be understood that the invention is not limited to the above disclosed embodiments. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

What is claimed as new and desired to be protected by Letters Patent of the United States is:

1. A method for location based gaming in a massively multiplayer online role playing game (MMORPG) supporting a virtual world, comprising:
administrating, via a game server, a travel task portion of a quest by a player character in said MMORPG, said travel task portion requiring said player character to travel from a virtual world location A to a virtual world location B, said administrating comprising:
receiving a real world location in a real world of a player of said player character;
mapping, based on said real world location of said player a real world location A' corresponding to said virtual world location A, a real world location B' corresponding to said virtual world location B, wherein said real world locations A' and B' satisfy one or more distance criteria associated with said quest, wherein the mapping selects the real world location B' for mapping to said virtual world location B based at least in part upon the real world location B' being a point-of-interest for the player in the real world;
monitoring said real world location of said player until said real world location of said player corresponds to said real world location A';
notifying said MMORPG that said player has reached the real world location A';
monitoring said real world location of said player until said real world location of said player corresponds to said real world location B';
notifying said MMORPG that said player has reached the real world location B'; and
advancing the player character directly from the virtual world location A to the virtual world location B after said MMORPG is notified that said player has reached the real world location B'.

2. The method of claim 1, further comprising:
creating said quest, wherein said quest comprises at least one task, said at least one task comprising said travel task portion;
creating said one or more distance criteria; and
associating said one or more distance criteria with said quest.

3. The method of claim 2, wherein said one or more distance criteria comprises a parameter relating to a range requirement in the real world between the real world locations A' and B'.

4. The method of claim 2, wherein said one or more distance criteria comprises a parameter relating to a range requirement in the real world between the real world location A' and said real world location of said player.

5. The method of claim 2, wherein said one or more distance criteria comprises a parameter relating to a range requirement in the real world between the real world location B' and said real world location of said player.

6. The method of claim 1, wherein said real world locations A' and B' are selected from publicly accessible points-of-interests.

7. The method of claim 6, wherein said publicly accessible points-of-interests are selected from at least one of:
coffee houses, restaurants, malls, stores, parks, libraries, museums, and publicly accessible government facilities.

8. The method of claim 1, further comprising:
setting a location of said player character to the virtual world location A when said real world location of said player corresponds to said real world location A'.

9. The method of claim 1, further comprising:
setting a location of said player character to the virtual world location B when said real world location of said player corresponds to said real world location B'.

10. The method of claim 1, wherein said player character is offered said quest when said player character travels to a predetermined location in said virtual world for initiating location based gaming.

11. The method of claim 1, wherein said player character is not visible to other player characters in said MMORPG who are not participating in location based gaming.

12. The method of claim 1, wherein said player character is visible to other player characters in said MMORPG but marked as participating in location based gaming.

13. The method of claim 1, wherein the virtual world is not a representation of the real world.

14. The method of claim 1, wherein the virtual world corresponds to a fictional or fantasy world.

15. The method of claim 1, wherein said player character is visible to other player characters in said MMORPG.

16. A method for location based gaming in a massively multiplayer online role playing game (MMORPG) supporting a virtual world, comprising:
performing, via a game client device, a travel task portion of a quest by a player character in said MMORPG, said travel task portion requiring said player character to travel from a virtual world location A to a virtual world location B, said performing comprising:
determining a real world location in a real world of a player of said player character;
sending said real world location of said player to a server;
receiving from said server, a real world location A' mapped to the virtual world location A;
periodically determining a real world location of said player while traveling toward said real world location A' and sending said real world location of said player to said server, until receiving a message from said server indicating that the player has traveled to the real world location A';
receiving from said server, a real world location B' mapped to the virtual world location B based at least in part upon the real world location B' being a point-of-interest for the player in the real world;
periodically determining a real world location of said player while traveling to the real world location B' and sending said real world location of said player to said server, until receiving a message from said server indicating that the player has traveled to the real world location B'; and
advancing the player character directly from the virtual world location A to the virtual world location B after said server determines that said player has reached the real world location B'.

17. The method of claim 16, wherein said real world locations A' and B' satisfy one or more distance criteria associated with said quest.

18. The method of claim 16, wherein said real world locations A' and B' are selected from publicly accessible points-of-interests.

19. The method of claim 18, wherein said publicly accessible points-of-interests are selected from at least one of: coffee houses, restaurants, malls, stores, parks, libraries, museums, and publicly accessible government facilities.

20. A non-transitory machine-readable medium comprising instructions, which, when executed by a machine, cause the machine to perform operations, the instructions comprising:
   at least one instruction to administrate a travel task portion of a quest by a player character in a massively multiplayer online role playing game (MMORPG), said travel task portion requiring said player character to travel from a virtual world location A to a virtual world location B, said at least one instruction to administrate comprising:
      at least one instruction to receive a real world location of a player of said player character;
      at least one instruction to map, based on said real world location of said player, a real world location A' corresponding to said virtual world location A, and a real world location B' corresponding to said virtual world location B, wherein said real world locations A' and B' satisfy one or more distance criteria associated with said quest, wherein the at least one instruction to map selects the real world location B' for mapping to said virtual world location B based at least in part upon the real world location B' being a point-of-interest for the player in the real world;
      at least one instruction to monitor said real world location of said player until said real world location of said player corresponds to said real world location A';
      at least one instruction to notify said MMORPG that said player has reached real world location A';
      at least one instruction to monitor said real world location of said player until said real world location of said player corresponds to said real world location B';
      at least one instruction to notify said MMORPG that said player has reached the real world location B'; and
      at least one instruction to advance the player character directly from the virtual world location A to the virtual world location B after said MMORPG is notified that said player has reached the real world location B'.

21. A non-transitory machine-readable medium comprising instructions, which, when executed by a machine, cause the machine to perform operations, the instructions comprising:
   at least one instruction to perform a travel task portion of a quest by a player character in a massively multiplayer online role playing game (MMORPG) supporting a virtual world, said travel task portion requiring said player character to travel from a virtual world location A to a virtual world location B, said instructions to perform comprising:
      at least one instruction to determine a real world location in a real world of a player of said player character;
      at least one instruction to send said real world location in a real world of said player to a server;
      at least one instruction to receive from said server, a real world location A' mapped to the virtual world location A;
      at least one instruction to periodically determine a real world location of said player while traveling towards said real world location A' and sending said real world location of said player to said server, until receiving a message from said server indicating that the player has traveled to the real world location A';
      at least one instruction to receive from said server, a real world location B' mapped to the virtual world location B based at least in part upon the real world location B' being a point-of-interest for the player in the real world; and
      at least one instruction to periodically determine a real world location of said player while traveling to the real world location B' and sending said real world location of said player to said server, until receiving a message from said server indicating that the player has traveled to the real world location B', wherein the player character is advanced directly from the virtual world location A to the virtual world location B after said server determines that the player has reached the real world location B'.

22. An apparatus for location based gaming in a massively multiplayer online role playing game (MMORPG) supporting a virtual world, comprising:
   means for administrating a travel task portion of a quest by a player character in said MMORPG, said travel task portion requiring said player character to travel from a virtual world location A to a virtual world location B, said means for administrating comprising:
      means for receiving a real world location of a player of said player character;
      means for mapping, based on said real world location of said player, a real world location A' corresponding to said virtual world location A, and a real world location B' corresponding to said virtual world location B, wherein said real world locations A' and B' satisfy one or more distance criteria associated with said quest, wherein the means for mapping selects the real world location B' for mapping to said virtual world location B based at least in part upon the real world location B' being a point-of-interest for the player in the real world;
      means for monitoring said real world location of said player until said real world location of said player corresponds to said real world location A';
      means for notifying said MMORPG that said player has reached the real world location A';
      means for monitoring said real world location of said player until said real world location of said player corresponds to said real world location B';
      means for notifying said MMORPG that said player has reached the real world location B'; and
      means for advancing the player character directly from the virtual world location A to the virtual world location B after said MMORPG is notified that said player has reached the real world location B'.

23. The apparatus of claim 22, further comprising:
   means for creating said quest, wherein said quest comprises at least one task, said at least one task comprising said travel task portion;
   means for creating said one or more distance criteria; and
   means for associating said one or more distance criteria with said quest.

24. An apparatus for location based gaming in a massively multiplayer online role playing game (MMORPG) supporting a virtual world, comprising:
   means for performing a travel task portion of a quest by a player character in said MMORPG, said travel task portion requiring said player character to travel from a virtual world location A to a virtual world location B, said means for performing comprising:

means for determining a real world location of a player of said player character;

means for sending said real world location of said player to a server;

means for receiving from said server, a real world location A' mapped to the virtual world location A;

means for periodically determining a real world location of said player while traveling toward said real world location A' and sending said real world location of said player to said server, until receiving a message from said server indicating that the player has traveled to the real world location A';

means for receiving from said server, a real world location B' mapped to the virtual world location B based at least in part upon the real world location B' being a point-of-interest for the player in the real world;

means for periodically determining a real world location of said player while traveling to the real world location B' and sending said real world location of said player to said server, until receiving a message from said server indicating that the player has traveled to the real world location B'; and means for advancing the player character directly from the virtual world location A to the virtual world location B after said server determines that said player has reached the real world location B'.

25. An apparatus for location based gaming in a massively multiplayer online role playing game (MMORPG) supporting a virtual world, comprising:

a memory; and a processor coupled to the memory and configured to:

administrate a travel task portion of a quest by a player character in said MMORPG, said travel task portion requiring said player character to travel from a virtual world location A to a virtual world location B, said administrating comprising:

receiving a real world location of a player of said player character;

mapping, based on said real world location of said player, a real world location A' corresponding to said virtual world location A, and a real world location B' corresponding to said virtual world location B, wherein said real world locations A' and B' satisfy one or more distance criteria associated with said quest, wherein the processor selects the real world location B' for mapping to said virtual world location B based at least in part upon the real world location B' being a point-of-interest for the player in the real world;

monitoring said real world location of said player until said real world location of said player corresponds to said real world location A';

notifying said MMORPG that said player has reached the real world location A';

monitoring said real world location of said player until said real world location of said player corresponds to said real world location B';

notifying said MMORPG that said player has reached the real world location B'; and advancing the player character directly from the virtual world location A to the virtual world location B after said MMORPG is notified that said player has reached the real world location B'.

26. An apparatus for location based gaming in a massively multiplayer online role playing game (MMORPG) supporting a virtual world, comprising:

performing a travel task portion of a quest by a player character in said MMORPG, said travel task portion requiring said player character to travel from a virtual world location A to a virtual world location B, said performing comprising:

determining a real world location of a player of said player character;

sending said real world location of said player to a server;

receiving from said server, a real world location A' mapped to the virtual world location A;

periodically determining a real world location of said player while traveling toward said real world location A' and sending said real world location of said player to said server, until receiving a message from said server indicating that the player has traveled to the real world location A';

receiving from said server, a real world location B' mapped to the virtual world location B based at least in part upon the real world location B' being a point-of-interest for the player in the real world; and periodically determining a real world location of said player while traveling to the real world location B' and sending said real world location of said player to said server, until receiving a message from said server indicating that the player has traveled to the real world location B'; and advancing the player character directly from the virtual world location A to the virtual world location B after said server determines that said player has reached the real world location B'.

* * * * *